US010397079B2

(12) United States Patent
Barrett et al.

(10) Patent No.: US 10,397,079 B2
(45) Date of Patent: Aug. 27, 2019

(54) VIDEO DELIVERY PERFORMANCE ANALYSIS FOR EMBMS

(71) Applicant: NetScout Systems, Inc, Westford, MA (US)

(72) Inventors: Paul Barrett, Westford, MA (US); Niranjan Keshavamurthy, Bangalore (IN)

(73) Assignee: Netscout Systems, Inc., Westford, MA (US)

( * ) Notice: Subject to any disclaimer, the term of this patent is extended or adjusted under 35 U.S.C. 154(b) by 0 days.

(21) Appl. No.: 15/439,558

(22) Filed: Feb. 22, 2017

(65) Prior Publication Data

US 2018/0091403 A1      Mar. 29, 2018

Related U.S. Application Data

(60) Provisional application No. 62/400,441, filed on Sep. 27, 2016.

(51) Int. Cl.
*H04L 12/26* (2006.01)
*H04L 12/18* (2006.01)
(Continued)

(52) U.S. Cl.
CPC ........ *H04L 43/0835* (2013.01); *H04L 1/0045* (2013.01); *H04L 1/0057* (2013.01);
(Continued)

(58) Field of Classification Search
CPC ... H04L 43/0835; H04L 65/80; H04L 41/509; H04L 1/0057; H04L 12/18; H04L 43/12;
(Continued)

(56) References Cited

U.S. PATENT DOCUMENTS

2007/0226577 A1* 9/2007 Lee ................ H04L 1/1809
714/751
2013/0254631 A1* 9/2013 Luby ................ H03M 13/356
714/776
(Continued)

FOREIGN PATENT DOCUMENTS

WO   WO-2016128803 A1   8/2016

OTHER PUBLICATIONS

Extended European Search Report for European Patent Application No. EP17193247.8, dated Jan. 25, 2018.

*Primary Examiner* — Kwang B Yao
*Assistant Examiner* — Moo Jeong
(74) *Attorney, Agent, or Firm* — Locke Lord LLP; Scott D. Wofsy; Christopher J. Capelli

(57) ABSTRACT

A system for evaluating quality of video delivered over a telecommunications network is provided. The system includes one or more monitoring probes coupled to one or more network interfaces providing direct communication between two or more networked devices. The monitoring probes are adapted to capture video data from the network interfaces. The system further includes a processor adapted to analyze the data captured by the monitoring probes. The processor is operatively configured to determine a number of lost data packets within the captured video data. The processor is further operatively configured to determine probability of unrecoverable losses within the captured video based on the determined number of lost data packets. The processor is also operatively configured to calculate a video quality index value based on the determined probability of unrecoverable loses.

17 Claims, 8 Drawing Sheets

(51) Int. Cl.
*H04L 1/00* (2006.01)
*H04W 84/04* (2009.01)
*H04L 29/06* (2006.01)
*H04L 12/24* (2006.01)

(52) U.S. Cl.
CPC .......... *H04L 12/18* (2013.01); *H04L 12/1868* (2013.01); *H04L 41/509* (2013.01); *H04L 43/12* (2013.01); *H04L 65/4069* (2013.01); *H04L 65/80* (2013.01); *H04W 84/042* (2013.01); *H04L 41/5009* (2013.01); *H04L 43/045* (2013.01); *H04L 43/18* (2013.01)

(58) Field of Classification Search
CPC ............... H04L 65/4069; H04L 1/0045; H04L 12/1868; H04L 43/18; H04L 43/045; H04L 41/5009; H04W 84/042
See application file for complete search history.

(56) References Cited

U.S. PATENT DOCUMENTS

| | | |
|---|---|---|
| 2013/0254634 A1 | 9/2013 | Luby et al. |
| 2014/0033242 A1* | 1/2014 | Rao ...................... H04N 21/442 725/14 |
| 2014/0307734 A1 | 10/2014 | Luby et al. |
| 2015/0078460 A1* | 3/2015 | Hu .......................... H04N 19/67 375/240.27 |
| 2015/0373074 A1* | 12/2015 | Lohmar .............. H04L 65/4076 709/219 |
| 2016/0182598 A1 | 6/2016 | Cossa |
| 2017/0223149 A1* | 8/2017 | Ponec ................... H04L 69/161 |

* cited by examiner

| ME Name | Application | Server | Client Community | Server Load | | | Failed Segments | | FEC | | |
|---|---|---|---|---|---|---|---|---|---|---|---|
| | | | | Total Sessions | Video | Video FDTs | Other Sessions | Video | Other | Overhead % | Source Symbols | Repair Symbols |
| EMBS1:if3 | FLUTE | BMSC | MBMS-GW | 1 | 3600 | 7200 | 120 | 0 | 0 | 8.8 | 910 | 80 |
| EMBS2:if3 | FLUTE | MBMSGW | 224.0.0.10 | 1 | 3600 | 7200 | 120 | 18 | 6 | 8.8 | 910 | 80 |
| EMBS3:if3 | FLUTE | MBMSGW | 224.0.0.11 | 1 | 3600 | 7200 | 120 | 17 | 6 | 8.8 | 910 | 80 |

| Bit Rate (Kbps) | Video Quality | | |
|---|---|---|---|
| | Packet loss % | Segment loss % | Quality Index |
| 816.4 | 0.00 | 0.00 | 4.4 |
| 816.4 | 1.00 | 0.25 | 4.4 |
| 816.4 | 0.90 | 0.24 | 4.4 |

FIG. 6A

VIDEO DELIVERY PERFORMANCE ANALYSIS FOR EMBMS

CROSS REFERENCE TO RELATED APPLICATIONS

This application claims priority under 35 U.S.C. § 119 from U.S. Provisional Application No. 62/400,441, entitled "System and Method for Determining Video Quality Analysis", filed on Sep. 27, 2016.

FIELD OF THE INVENTION

Embodiments of the present invention relate to perceptual video quality measurements and, more particularly, to video delivery performance analysis for evolved Multimedia Broadcast/Multicast Service (eMBMS).

BACKGROUND OF THE INVENTION

A Long-Term Evolution (LTE) system offers high peak data rates, low latency, improved system capacity, and low operating cost resulting from simple network architecture. An LTE system also provides seamless integration to older wireless networks, such as Global System for Mobile Communications (GSM), Code Division Multiple Access (CDMA), and Universal Mobile Telecommunication System (UMTS). In LTE systems, an evolved universal terrestrial radio access network (E-UTRAN) includes a plurality of evolved Node-Bs (eNBs) communicating with a plurality of mobile stations, referred as user equipment (UE). Over the years, enhancements to LTE systems have been made by the third Generation Partnership Project (3GPP) so that an LTE Advanced (LTE-A) system can meet or exceed International Mobile Telecommunications Advanced (IMT-Advanced) fourth generation (4G) standard.

Over-the-top (OTT) content distribution is the delivery of audio, video, and other types of multimedia content over the Internet typically without any control of the content distribution by the network operators and/or by the content providers. The providers of OTT content are typically third party providers which utilize the network's infrastructure to provide content to their subscribers. As such, OTT content providers are not responsible for controlling redistribution of the content. Examples for OTT content providers are Hulu®, Netflix®, and the like.

MBMS is a broadcasting service offered via existing GSM and UMTS cellular networks. e-MBMS has been introduced in the LTE specification for broadcasting or multicasting TV, films, and other information such as overnight transmission of newspapers in a digital form. To facilitate MBMS in LTE systems, a multicast control channel (MCCH) is used for the transmission of MBMS control information in each MBMS Single Frequency Network (MBSFN) area, and a multicast traffic channel (MTCH) is used for the transmission of user traffic to UEs receiving MBMS data packets. MBMS has the major benefit that the network infrastructure already exists for mobile network operators and that deployment can be cost effective compared with building a new network for the service. The broadcast capability enables to reach unlimited number of users with constant network load. The broadcast capability also enables the possibility to broadcast information simultaneously to many cellular subscribers, such as emergency alerts.

One protocol for delivering broadcast services is File Delivery over Unidirectional Transport (FLUTE), which is defined in Internet Engineering Task Force (IETF) Request for Comments (RFC) 3926 and RFC 6726. FLUTE may be used for the delivery of large and small files to many hosts, using delivery sessions of several seconds or more. For instance, FLUTE could be used for the delivery of large software updates to many hosts simultaneously. FLUTE could also be used for continuous, but segmented, data. FLUTE is also suitable for the basic transport of metadata, for example Session Description Protocol (SDP) files that enable user applications to access multimedia sessions. FLUTE can be used with both multicast and unicast delivery, but its primary application is for unidirectional multicast file delivery.

It is desirable to obtain metrics for analyzing the performance of FLUTE based video delivery for eMBMS in an LTE network.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for evaluating quality of video delivered over a telecommunications network is provided. The system includes one or more monitoring probes coupled to one or more network interfaces providing direct communication between two or more networked devices. The monitoring probes are adapted to capture video data from the network interfaces. The system further includes a processor adapted to analyze the data captured by the monitoring probes. The processor is operatively configured to determine a number of lost data packets within the captured video data. The processor is further operatively configured to determine probability of unrecoverable losses within the captured video based on the determined number of lost data packets. The processor is also operatively configured to calculate a video quality index value based on the determined probability of unrecoverable loses.

In another aspect, a method for evaluating quality of video delivered over a telecommunications network is provided. The method includes receiving captured video data from one or more monitoring probes coupled to one or more network interfaces providing direct communication between two or more networked devices. The captured video data is analyzed to determine a number of lost data packets. Probability of unrecoverable losses within the captured video data is determined based on the determined number of lost data packets. A video quality index value is calculated based on the determined probability of unrecoverable losses.

BRIEF DESCRIPTION OF THE DRAWINGS

The accompanying appendices and/or drawings illustrate various, non-limiting. examples, inventive aspects in accordance with the present disclosure:

FIGS. 6A-6B depict exemplary screenshots generated by the quality assessment system, in accordance with an illustrative embodiment of the present invention.

DETAILED DESCRIPTION OF CERTAIN EMBODIMENTS

Figure 1:
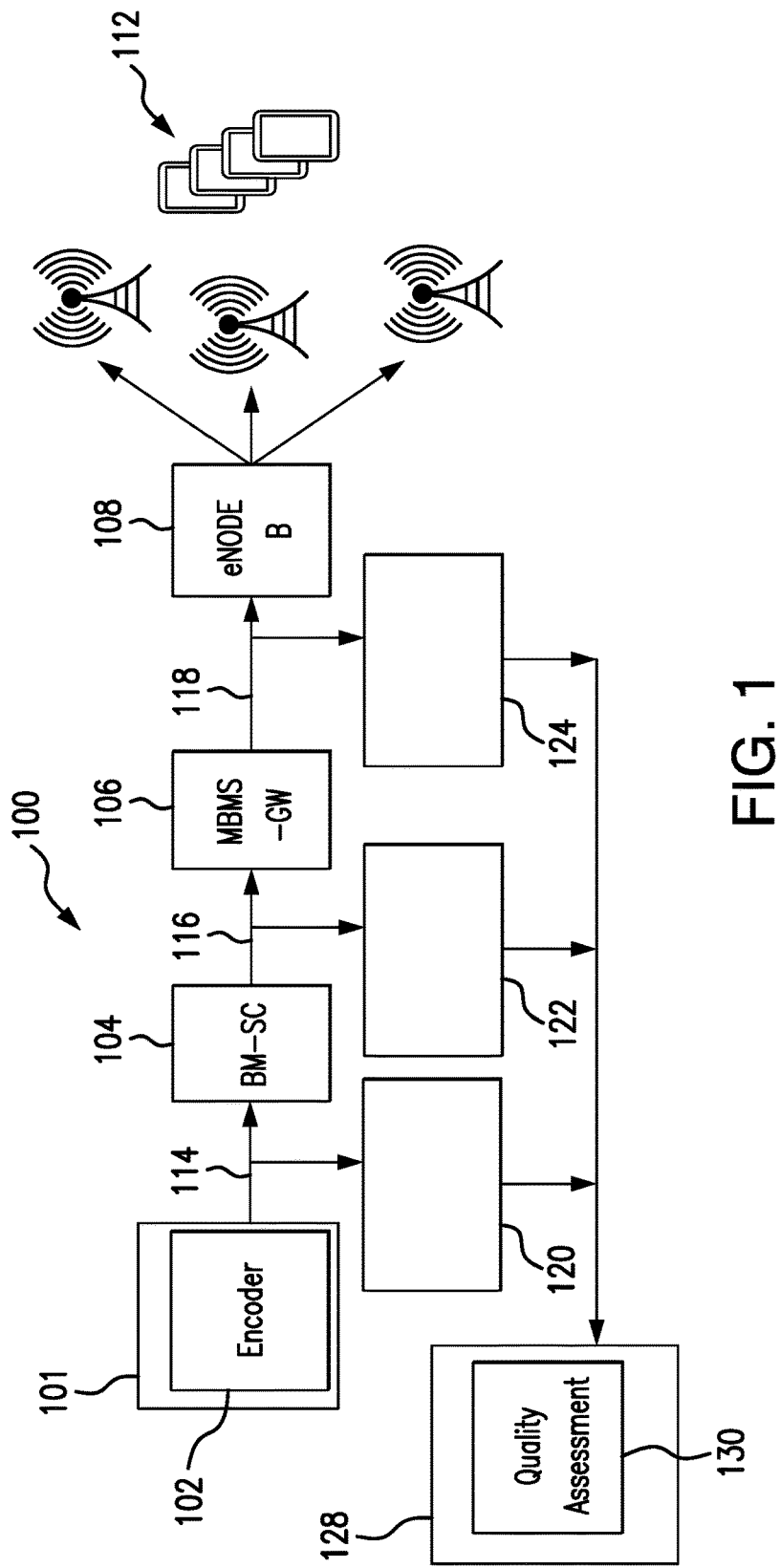
FIG. 1 is a block diagram conceptually illustrating eMBMS video transmission.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Most objective quality prediction models only produce a single Mean Opinion Score ("MOS") value. The result is that the single MOS value provides the ability to detect quality problems, but does not provide any insight into the source of the problems. Of course, in many situations, a single quality score may be accompanied by lower level metrics, such as bit-rate, packet loss, etc. However, it is not always clear which factors are actually affecting the end-user's perception of quality and which are not.

While the description below is presented with regard to a LTE network, this is not meant to be limiting and the present methods and systems could equally be used with other types of networks that can be used for transmission of encoded media.

Embodiments of the present disclosure provide more insight into which factors are actually affecting the quality of a video signal transmitted over the eMBMS service as perceived by an end-user by identifying three quality metrics for an eMBMS video transmission. These three quality metrics identify the source encoding (i.e., the combination of video codec used, bit-rate and image resolution), measure packet loss concealment from packet loss due to missing video segments in the video stream, and measure the ability of forward error correction (FEC) to correct for packet loss on the air interface. One benefit of this model is that it provides more insight into which factors are actually affecting the quality perceived by the end-user.

Referring to FIG. 1 of the drawings, there is shown a typical system that transmits video signals over eMBMS. The system includes a media server 101, a Broadcast Multicast Service Center (BMSC) 104, a MBMS gateway (MBMS-GW) 106 and eNODE-B 108 and a plurality of monitoring components, such as, but not limited to network monitoring probes 120-124 and a quality analyzing system 128.

The media server 101 may be a computing device that includes one or more encoders 102, each of which may be implemented using hardware and/or software (e.g., instructions executable by the processor(s) of media server 101). In a particular embodiment, the encoding module 102 may be part of a software application provided by a vendor of the media server 101. The media server 101 may use the encoder(s) 102 to generate an encoded video stream. In a particular embodiment, the generated video stream is a live video stream. Before transmission, the encoder 102 divides the streaming data into segments of fixed duration. In one embodiment this fixed duration can range between approximately 0.5 seconds and approximately 2 seconds.

Dynamic Adaptive Streaming over HTTP (DASH) is a known method for transmission of video in a unicast environment. Use of DASH in unicast obtains the entire file. DASH may convert the video file into smaller components called DASH segments, which may be reassembled at the receiving device to display the desired video. The media server 101 packages the generated video stream into a segmented DASH format file.

Next, the media server 101 sends the packaged DASH format file to a multimedia streaming service node, such as BMSC 104 shown in FIG. 1. Hereinafter, the term BMSC will be used, but it is to be understood that the embodiments presented can equally well be employed with other embodiments of multimedia streaming service nodes. The multimedia streaming service node 104 is responsible for the general flow of content from content providers (i.e., the media server 101) to the streaming clients (end user devices) 112, including providing both main streaming content and secondary streaming content at appropriate points in time. Secondary streaming content can be, for example, advertisements, special announcements, emergency messages, etc. Main streaming content is the main content of the content channel in which the secondary streaming content can be included.

In one embodiment, the media server 101 sends the packaged DASH format file to the BMSC 104 using WebDAV protocol. WebDAV stands for "Web Distributed Authoring and Versioning." WebDAV is a set of extensions to the HTTP, which is the standard protocol that allows Web browsers to talk to Web servers.

Existing solutions for multicasting OTT stream content are limited as they cannot provide efficient and guaranteed delivery of multicast UDP packets. According to embodiments of the present invention, in order to provide resilience to packet loss on the air interface (and in the core network) BMSC 104 may apply forward error correction (FEC) to the DASH segments (files), and may schedule the files for transmission as part of a FLUTE session used to broadcast segments for the multimedia service. FLUTE protocol represents a protocol for the unidirectional delivery of files over IP (Internet Protocol) based networks, which is particularly suited to multicast networks, wherein common data is sent from one IP based entity to a plurality of IP based hosts. The FLUTE specification builds on the Asynchronous Layered Coding (ALC) protocol, the base protocol designed for massively scalable multicast distribution. FLUTE is applicable to the delivery of large and small files to many IP based hosts, using delivery sessions of several seconds or more.

Next, the BMSC 104 sends the FLUTE encoded files to the MBMS-GW 106 over a unicast connection. MBMS-GW 106 provides multicast and broadband transmissions. According to an embodiment of the present invention, MBMS-GW 106 packetizes the received FLUTE encoded file and delivers them to the SYNC protocol endpoint at the MBMS-GW 106. The SYNC protocol is used to simultaneously employ multiple transmissions of packets from multiple cell locations, so that the radio processing in the client device 112 will treat the packet copies as multi-path propagation and aggregate them. The SYNC protocol adds a SYNC timestamp in the SYNC header of every outgoing packet, and multicasts the packets to eNodeB devices 108 where the service is broadcasted. eNodeB devices 108 use this timestamp to determine in which MCH Scheduling Period (MSP) to transmit the packets, and to ensure that all eNodeB devices 108 in the same multicast-broadcast single-frequency network (MBSFN) transmit the data synchronously on any given MCH.

To summarize, after video data has been encoded, the unicast protocol stack that can be used at links 116 directly connecting the BMSC 104 with the MBMS-GW 106 includes the following protocols: IP, UDP, FLUTE, DASH file format and H.264 encoded video. Furthermore, the multicast protocol stack that can be used at links 118 (i.e., M1 links) directly connecting the MBMS-GW 106 with the eNodeB devices 108 includes these protocols: IP, UDP, GTP-U, SYNC, IP, UDP, FLUTE, DASH file format and H.264 encoded video.

It should be further noted that when a FLUTE session is opened over links 116 and 118, the encoded video files and an FDT (File Description Table) are transmitted. The FDT typically describes how the FEC has been applied to each transmitted file. The FDT is described in greater detail below. Typically, FDT packets may be repeated while the file is transmitted. FEC is a well-known technique that overcomes packet loss by utilizing redundancy. FEC is described in greater detail below in conjunction with FIG. 2. There are various FEC codes that are suitable for different loss rates and applications. IETF Reliable Multicast Working Group has specified three FEC schemes to be used for delivering content reliably, namely, RaptorQ (as described in RFC 6330), Low-density parity-check (LDPC) (as described in RFC 5170), and Reed-Solomon (as described in RFC 5510). Other known FEC techniques include Raptor R10 (as described in RFC 5053), which is an older version of RaptorQ. Various embodiments of the present invention may employ one of the aforementioned schemes. Each video file may be encoded with one FEC encoding ID and may generate source encoding symbols and repair symbols described below. The applied FEC is included in the respective FDT instance. However, FEC is not applied to FDT packets. Hence, lost FDT packets may also result in unrecoverable video segments.

Referring back to FIG. 1, the system 100 may include one or more monitoring probes. For example, in the illustrated embodiment, one or more first network monitoring probes 120 may be configured to monitor the links between the media server 102 and the BMSC 104 in order to detect any missing HTTP video data segments due to failure in DASH segmentation, for example. It should be noted that detection of missing data segments may require further analysis of file system functions provided through a WebDAV interface. Furthermore, one or more second network monitoring probes 122 may be configured to monitor the unicast links 116 between the BMSC 104 and the MBMS-GW 106. In addition, one or more third network monitoring probes 124 may be configured to monitor packets passed over the multicast links 118 between the MBMS-GW 106 and the eNodeB 108. At least in some embodiments, the one or more third network monitoring probes 124 should be placed as close to the eNodeB 108 as practical to ensure that any UDP packet loss in the network system 100 is detected and accounted for.

As shown in FIG. 1, each of the first 120, second 122 and third 124 monitoring probes may send acquired data to a quality analyzing system 128 hosting a quality assessment module 130. The quality assessment module 130 may generally be a software application comprising one or more modules that assesses quality of end-to-end streaming media sessions transmitted via the eMBMS communication system 100.

Figure 2:
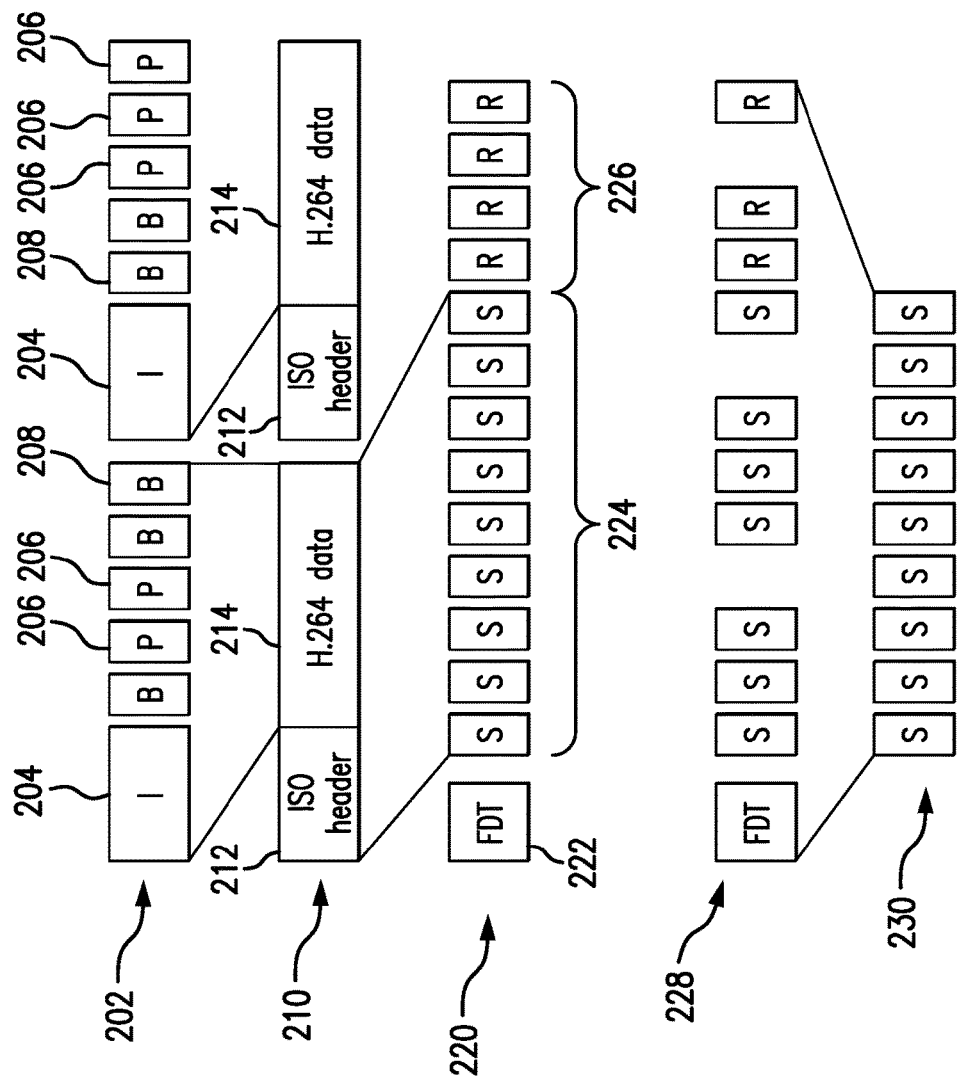
FIG. 2 illustrates details of typical eMBMS video transmission segmentation, in accordance with an illustrative embodiment of the present invention.

FIG. 2 illustrates details of typical eMBMS video transmission segmentation, in accordance with an illustrative embodiment of the present invention. As shown in FIG. 2, three types of frames are defined in the H.264 (defined in the ISO/IEC 14496-10) standard: intra (I) frames 204, predicted (P) frames 206, and bi-directionally interpolated (B) frames 208. I frames 204 contain a self-contained representation of a complete video frame or video frame slice and provide access points for random access. P frames 206 are coded with references to previous frames (in presentation order), which are considered reference frames and in most cases are types of I frames 204 or P frames 206. Since P frames describe changes relative to an I frame, they are typically much smaller than I frames. B frames 208 use both reference frames from the past and from the future (in presentation order); like P frames they are much smaller than I frames. The above standard does not impose any limit to the number of non-reference frames between two reference frames. In most cases, I frames 204 and P frames 206 are reference frames whereas B frames 208 are non-reference. In H.264, however, B frame 208 can be marked as non-reference or reference frame. B frame 208 that is marked as reference frame is called B-reference (Bref), which is a B type frame that can be a reference for other frames.

In DASH framework 210, each video segment file may have its own file header 212. The file header 212 contains all the video file properties and internal video container metadata, such as duration, compression type, size, and bit rate that are needed for decoding by any player. The file headers 212 are followed by the H.264 encoded video segments 214. In one embodiment, the generated video content can be segmented into ISO Base Media File Format (BMFF) segments 214 for MPEG-DASH. In various embodiments, the segments 214 can be created for 0.5, 1 and 2 second segment lengths.

As described above the eMBMS delivery method uses FLUTE protocol 220 when delivering DASH-formatted video content 210 over MBMS bearers. The FLUTE protocol 220 is used for file delivery over UDP. FLUTE in the BMSC 104 cares about partitioning a media file into a sequence of media segments, namely UDP packets. Thus, FLUTE 220 is a protocol, which allows delivery of files, like DASH files over broadcast using UDP as a transport protocol.

FLUTE 220 adds the needed mechanism of associating HTTP like metadata such as a Content-Location and Content-Type to a Transmission Object. In particular, FLUTE defines the aforementioned FDT 222, which is basically a list containing an association of file metadata to the transmission object identifiers. The client devices 112 maintain the FDT 222 and the sender (i.e., BMSC 104) can add entries by using FDT instances, which are sent as transmission objects.

As already mentioned, the BMSC 104 may apply FEC to the DASH segments (files) 214. In FEC, instead of sending an original flow of packets (where each packet represents a piece of the data), the sender encodes the data into a new set of packets (where each packet holds information about various parts of original data with additional parity data). The new set is generally larger in size compared to the original data. The receiver of the encoded data performs decoding and, once it receives enough coded packets, reconstructs the original data. To reconstruct the data usually only the same amount of encoded data as the original data size needs to be received, or slightly more. This allows for the transfer to be lossy while still being able to decode the original data without any need for retransmission of the data. There are various FEC codes (mentioned above) that are suitable for different loss rates and applications.

In one non-limiting embodiment, the FEC scheme used to encode the video segment files 214 may be the R10 Raptor scheme. For some applications, other variations of codes might be more suitable or otherwise preferred. As used herein, input symbols refer to the data received from a video file or stream and source symbols refer to the symbols that are used to generate output symbols. In some cases, the source symbols include the input symbols and in some cases, the source symbols are the input symbols. However, there are cases where the input symbols are encoded and/or transformed into an intermediate set of symbols and that intermediate set is used to generate the output symbols without reference to the input symbols (directly). Thus, input symbols comprise information known to the sender which is to be communicated to the receiver, source symbols are the symbols used by at least one stage of an encoder and are derived from the input symbols, and output symbols comprise symbols that are transmitted by the sender to the receiver. For example, the BMSC 104 may divide the sequence to be encoded into symbols of length T bytes. The encoded sequence produced by the BMSC 104 comprises the original source data divided into K source symbols 224, followed by R repair symbols 226. One property of the encoded symbols produced by BMSC's 104 encoder is that a receiver is able to recover the original file as soon as enough encoded symbols have been received. Specifically, to recover the original K source symbols with a high probability, the receiver needs approximately K+A encoded symbols.

The "absolute reception overhead" for a given situation is represented by the value A, while a "relative reception overhead" can be calculated as the ratio A/K. The absolute reception overhead is a measure of how much extra data needs to be received beyond the information theoretic minimal amount of data, and it may depend on the reliability of the decoder and may vary as a function of the number, K, of source symbols. Similarly, the relative reception overhead, A/K, is a measure of how much extra data needs to be received beyond the information theoretic minimal amount of data relative to the size of the source data being recovered, and also may depend on the reliability of the decoder and may vary as a function of the number K of source symbols.

In other words, FEC may be accomplished by adding redundancy to the transmitted information. A redundant bit may be a complex function of many original information bits. The original information may or may not appear literally in the encoded output. Codes that include the unmodified input data in the output data may be referred to as systematic. Codes that do not include the unmodified input data in the encoded output data may be referred to as non-systematic. Raptor code is an example of a systematic code. It should be noted that long input data sequences may be divided into blocks by the BMSC 104, which are typically encoded independently.

The transmission overhead of the FEC is defined by the following equation (1):

$$\text{FEC Overhead} = R/K, \quad (1)$$

where R represents a number of encoded repair symbols and K represents a number of encoded source symbols. In various embodiments, the level of FEC overhead may be a global configurable parameter of the system.

To illustrate the FEC overhead consider the following example, where a 1 second video file having a size of 102,050 bytes is encoded using a symbol size of 112 bytes. If the original source data is encoded using 912 symbols and 80 repair symbols are appended to the encoded sequence, equation (1) yields an FEC overhead of 80/912 or approximately 8.77%. In this example, each UDP packet may have 10 symbols.

The probability $P_f$ that a given FEC block cannot be recovered is defined by the following system of equations (2):

$$P_f=1; \text{ if } N<K;$$

$$P_f=0.85*0.567^{N-K}; \text{ if } N \geq K, \quad (2)$$

where N represents the total number of source and repair symbols received after any packet loss 228. It should be noted that equation (2) holds for K>200. FIG. 2 also illustrates Raptor FEC decoded symbols 230 that are decoded using FDT information 222.

It should be further noted that with the illustrated above FEC overhead of approximately 8%, under bursty packet loss conditions, a loss rate of just a few percent can accumulate to a significant number of unrecoverable files. As further recognized herein, a file recovery failure rate of approximately 1% can cause visible video errors or audible noise, diminishing the quality of the A/V display and, thus, the viewer's enjoyment.

The proposed embodiments of the present invention address this and other aforementioned problems as described below in conjunction with FIG. 3.

Figure 3:
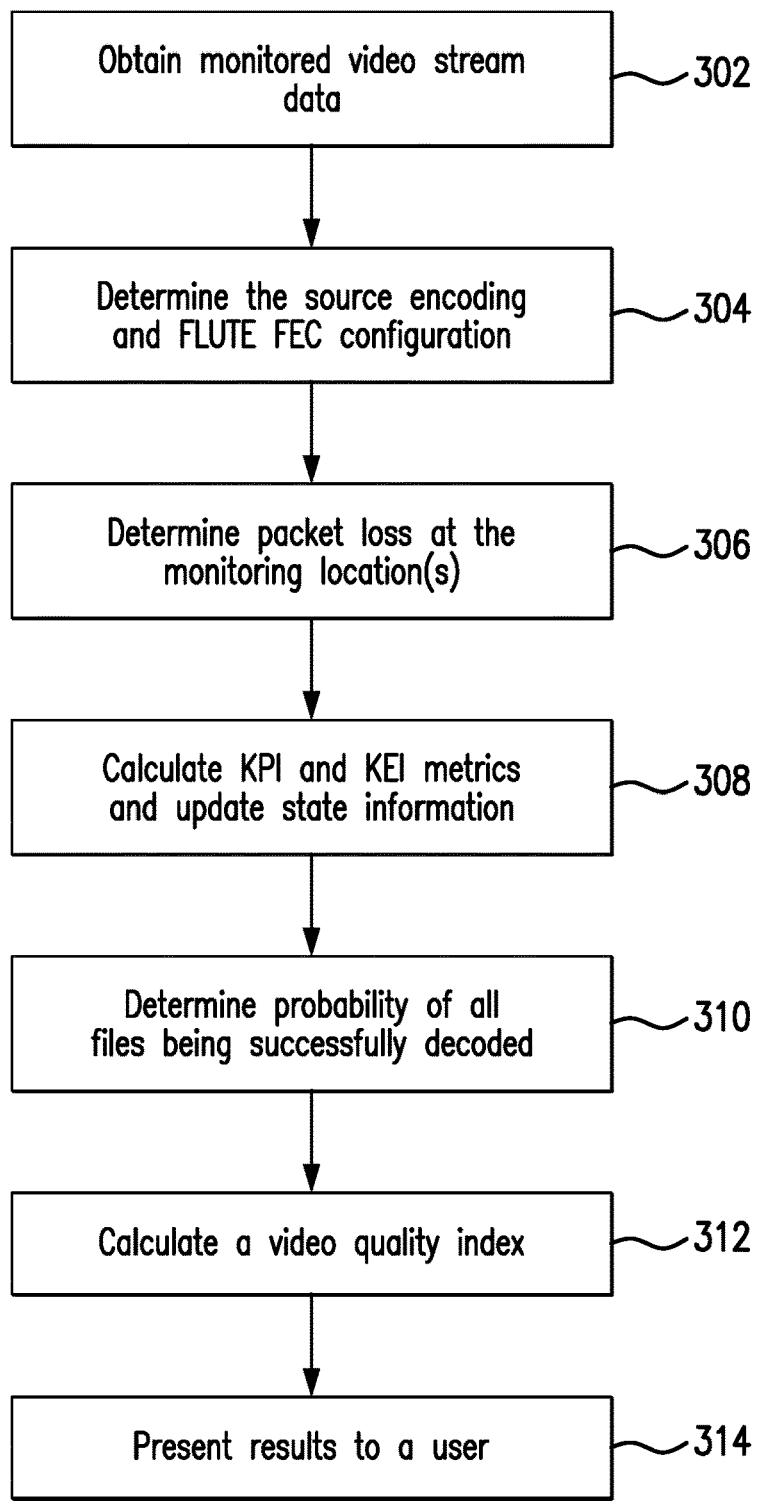
FIG. 3 is a flowchart of operational steps carried out by the quality assessment system of FIG. 1, in accordance with an illustrative embodiment of the present invention.

FIG. 3 is a flowchart of operational steps of the quality assessment module 130 of FIG. 1, in accordance with exemplary embodiments of the present invention. Before turning to description of FIG. 3, it is noted that the flow diagram shown therein is described, by way of example, with reference to components shown in FIGS. 1-2 and 4-5, although these operational steps may be carried out in any system and are not limited to the scenario shown in the aforementioned figure. Additionally, the flow diagram in FIG. 3 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

The quality assessment module 130 may generally be a software application comprising one or more modules that assesses quality of end-to-end video data streaming sessions transmitted via the eMBMS system 100. At 302, the quality assessment module 130 preferably receives at least a portion of an incoming video stream transmitted by the media server 101 using the plurality of network monitoring probes 120-124. In various embodiments, each of the probes 120-124 may be configured for monitoring at least one of the dedicated communication links 114-118, as described above.

Next, at step 304, the quality assessment module 130 determines the video duration and FEC parameters from the associated FDT and estimates the type of content from the file suffix. The configuration of the FEC directly determines how resilient the video transmission will be to packet loss, both in the core and on the air-interface. According to FLUTE protocol, each FLUTE session can transfer one or more files, also called transfer objects. In FLUTE protocol different TOIs (transmission object identifiers) will be allocated for each transfer objects (files) to distinguish between different files. Furthermore, step 304 may further involve extraction of certain FDT fields, such as "FDT-Instance Expires: field (further described below) that can be used to indicate the expected expiry time of a specific file segment (e.g., by which time all symbols are expected at the destination), "Content-Location" field that can be used to check if FDT is associated with a DASH video file and "TOI" field that can be used for correlation with captured video packets.

According to an embodiment of the present invention, at step 306, the quality assessment module 130 may determine a number of missing video segments in the video stream received by the BMSC 104. In addition, the quality assessment module 130 may determine packet loss at each link monitored by the plurality of probes 120-124. For example, the quality assessment module 130 can use packet sequence numbers included in each FLUTE header to detect a packet loss and to ensure that packets are decoded in the correct order. It should be noted the system described herein is substantially resilient to out of order packets, as long as all packets are received by the expiry time of the corresponding file segment. Packet loss and jitter are typically among the most significant sources for video/audio impairment introduced in multimedia transmission. Advantageously, step 306 may also involve determination of a number of missing FDT packets, which are crucial for decoding captured video segments. It should be noted that within a file delivery session FDT can be delivered more than once. Furthermore, FDT may appear in any part of the file delivery session and even multiplexed with other objects. Hence, at least in some cases, the quality assessment module 130 may defer the classification of the received video files if the first FDT is missing, but a subsequent one is received later. If the quality assessment module 130 does not detect any FDTs, it has no means to distinguish between video files encoded with the Raptor FEC, for example, and other files encoded with no FEC.

In various embodiments, the eMBMS system 100 may support a few different FLUTE message types. In one embodiment, the eMBMS system 100 may support transmission of Raptor encoded video files (TOI>0 as TOI=0 represents a FDT packet) having an FDT available. Based on the FEC Object Transmission Information ("OTI") the quality assessment module 130 receives (or is able to infer), the quality assessment module 130 can determine the source block and sub-block structure of the file transfer. For example, in [Raptor-RFC-5053] and [RaptorQ-RFC-6330], the FEC Payload ID is (SBN, ESI), where in [Raptor-RFC-5053] the source block number (SBN) is 16 bits and the encoding symbol ID (ESI) is 16 bits, whereas in [RaptorQ-RFC-6330] the SBN is 8 bits and the ESI is 24 bits. In other embodiments, the eMBMS system 100 may support files with TOI>0 and a non-video FDT available and/or files with no associated FDT whatsoever. In some embodiments it may be desirable to split each video file into multiple FEC blocks, although this is unlikely for short video segments.

According to embodiments of the present invention, the quality assessment module 130 analyzes the FEC applied to multicast video files and using transmission state information detects various errors and accumulates various metrics. In one embodiment, the quality assessment module 130 may maintain two different tables. The first table (referred to hereinafter as Key Server Indicators ("KSI")) may contain a set of generic entries that are associated with various statistical counters, such as, but not limited to, Key Performance Indicators ("KPIs"), for example. The second table (referred to hereinafter as Key Error Indicators ("KEI")) may contain entries that store transmission error information and additional counters used in the video quality analysis performed by module 130 that are not present in the KSI table.

At step 308, the quality assessment module 130 may generate a plurality of metrics at least some of which are shown in Table 1 below:

TABLE 1

| Group | Column | KxI table | Calculation |
|---|---|---|---|
| Server Load | Sessions | KSI | Number of UDP Sessions |
| | FDT | KSI | Successful + Failed FDT transactions |
| | Video | KSI | Successful + Failed Video transactions |
| | Other | KSI | Successful + Failed Other transactions |
| Failures | Video | KSI | Failed/(Successful + Failed) Video transactions |
| | Other | KSI | Failed/(Successful + Failed) Other transactions |
| FEC | Overhead | KEI | K/R |
| | K | KEI, KSI | K/F |
| | R | KEI, KSI | R/F |
| Video | Bitrate | KEI | 8 * B/L |
| | Packet loss | KEI | (Ep − Np)/Ep |
| | File loss | KEI | M/F |
| | Quality | KEI | Q/F |

In table 1, F corresponds to the total number of video files analyzed and the session's metrics corresponds to an average number of UDP sessions per open connection. As used herein, the successful other files transactions metric corresponds to a number of files transferred with an associated FDT available; while the successful video file transactions metric corresponds to a number of video files with a higher likelihood of being correctly decoded (e.g., FDT being available and a sufficient number of packets captured, i.e., Np≥Kp). Alternatively, the failed other files transactions metric corresponds to a number of files transferred with no associated FDT available; while the failed video file transactions metric corresponds to a number of encoded video files with an FDT being available but having an insufficient number of packets being captured (i.e., Np<Kp).

It should be noted that at least in some embodiments, the monitoring components of system 100 are configured to selectively monitor FLUTE sessions only if there is a FLUTE sibling application that can match the destination addresses. In other words, when processing captured data, the quality assessment module 130 should be enabled to correlate the destination address of the session unicasting (e.g., using HTTP over TCP/IP) encoded video segment files over the unicast links 116 with the multi-cast destination address of the broadcasting session over the multicast links 118. According to one embodiment of the present invention, the quality assessment module 130 may be configured such that each combination of server and multicast address is mapped to its own row stored in the aforementioned KSI and KEI tables.

According to various embodiments of the present invention, in addition to metrics shown above, the quality assessment module 130 maintains the following counters in the KEI table for encoded video files: a number of video FDT tables, total number of FEC packets received (Np), total expected number of FEC packets (Ep), total expected number of source packets (Kp), elapsed time of video segment (L)), total number of bytes in a corresponding video segment (B), expected number of source symbols (K) and repair Symbols (R), total number of encoded files that cannot be properly decoded, given the packet loss rate at the monitoring location (M) and the overall video quality index (Q). In one embodiment, the network monitoring probes 120-124 may determine the number of received video FDT tables by examining headers and payload of each FLUTE packet. For instance, the FDT table can be detected when the TOI=0 in the FLUTE header and if "FEC-OTI-FEC-Encoding-ID" field is equal to 1 and the "Content-Location" field contains a ".m4s" suffix or any other suitable suffix enabled for video quality monitoring in the FDT XML payload. It should be further noted that Np parameter may be calculated by counting all received packets having TOI. According to an embodiment of the present invention, other KEI video metrics may be calculated by the quality assessment module 130 as shown below:

$Ep = ESI\_last/Symbols\ per\ packet;$ $Kp = ContentLength\ (or\ TransferLength)/(Symbol\ Length*SymbolsPerPacket);$ $B = Sum\ of\ All\ ContentLength\ (or\ TransferLength);$ $K = ContentLength\ (or\ TransferLength)/(Symbol\ Length);$ $R = (Ep*Symbols\ per\ packet) - K;$ and $L = sum(last\_expiry\_in\_sec - cur\_expiry\_in\_sec).$ As will be apparent to those skilled in the art, at least some of the above metrics (i.e., Kp, L, B, K, R and M) can be calculated only if FDT information is available to the quality assessment module 130. Each FDT instance typically contains an "expires" attribute, which defines an expiry time of that particular FDT instance. According to an embodiment of the present invention, the quality assessment module 130 may calculate the elapsed time, L, by determining the difference between FDT-Instance Expires in consecutively received FDTs. Furthermore, in order to ensure accurate calculation of the bit rate metric, the quality assessment module 130 may update the sum of all content length, B, only using the "Transfer-Length" field of the FDT packet and only for those files that have been completely received and for which the elapsed time has been calculated.

As shown in FIG. 3, in addition to calculating various KSI and KEI statistics, step 308 may further involve updating transmission state information that needs to be maintained by the quality assessment module 130 while processing an encoded FLUTE video block. Table 2 shown below illustrates exemplary state parameters that may be maintained by the quality assessment module 130:

TABLE 2

| Parameter | Description | Source |
|---|---|---|
| TSI | Transport Session Identifier, used to correlate FDT data with FLUTE media session | FDT and FLUTE media packets |
| TOI | Transport Object Identifier, used to correlate FDT data with the FLUTE encoded video file | FDT and FLUTE media packets |
| Z | The number of FEC blocks in the file (included in "FEC-OTI-Scheme-Specific-Info" field) | FDT |
| T | FDT Symbol length, needed to determine number of symbols in FLUTE media file ("FEC-OTI-Encoding-Symbol-Length") | FDT |
| K | ContentLength(or TransferLength)/T | FDT |
| L | Difference between FDT-Instance Expires in consecutive FDTs | FDT |
| E | Number of expected symbols, calculated by comparing the symbol IDs in the first and last | FLUTE media packets |

TABLE 2-continued

| Parameter | Description | Source |
|---|---|---|
| N | packets of the block Number of received symbols in block, calculated by multiplying the count of received packets by G | FLUTE media packets |
| G | Number of symbols in each FLUTE packet, calculated from first FLUTE media packet in the block and T | FLUTE media packets |

It should be noted that to maintain this state table, the quality assessment module 130 needs to process data packets carrying the FDT table information (i.e., FDT instance objects) and process FLUTE packets carrying the expiry time assigned to a file delivery descriptor entry from the corresponding FLUTE encoded video files. For calculation of K parameter, the quality assessment module 130 may use the parsed out "Transfer-Length" field or may use the "Content-Length" field if the "Transfer-Length" field is not provided by the received file.

Since the multicast packets could arrive out of order and there is no explicit information indicating how long an encoded FEC block is, the quality assessment module 130 is preferably configured to wait until the corresponding segment expires in order to infer the end of a block, for example, by counting the received symbols. It should be further noted that the quality assessment module 130 does not depend on the end of the session flag (A) and end of object flag (B) in the FLUTE packet header, as the packet containing the flags may be lost. Instead, the expected number of packets is derived by tracking the highest sequence number seen in a given block.

Referring back to FIG. 3, according to an embodiment of the present invention, after calculating the metrics described above, at step 310, the quality assessment module 130 determines a probability of all files being successfully decoded, given any determined packet losses at the monitoring locations identified in step 306. Alternatively, the quality assessment module 130 may determine the number of unrecoverable files (M) that cannot be decoded. In one embodiment, M may be equal to the sum of $P_f$ over the files in the evaluated period of time, where Pf can be calculated using equation (2) above. If the captured video file contains multiple FEC blocks, the value Pf for such file is calculated using Equation (3):

$$P_f = 1 - MULT_i(1 - P_{f,i}), \quad (3)$$

where $P_{f,i}$ is the probability of the $i^{th}$ block failing and $MULT_i$ multiplies $P_{f,i}$ values together over the block index. In other words, the MULT operation provides the probability of all blocks being successfully decoded. It is noted that the quality assessment module 130 primarily focuses on the FEC's ability to automatically correct the detected packet loss on the air interface and in the core network.

Next, according to an embodiment of the present invention, at step 312, the quality assessment module 130 calculates a video quality index value based on the determined probability of unrecoverable video files. In one embodiment, the quality assessment module 130 may determine the video quality index using the following Equation (4):

$$Q = \max(1.0, B_0 L + B_1 L^2 + B_2 L + B_3), \quad (4)$$

where L is the average file loss in the reporting time interval. It should be noted that coefficients $B_0$, $B_1$, $B_2$ and $B_3$ can either be derived mathematically or determined experimentally.

At step 314, the quality assessment module 130 may send video delivery monitoring results to a graphical user interface (GUI). In one embodiment, these monitoring results may be presented to a user in two different modes, as described below in conjunction with FIGS. 6A-6B.

Figure 4:
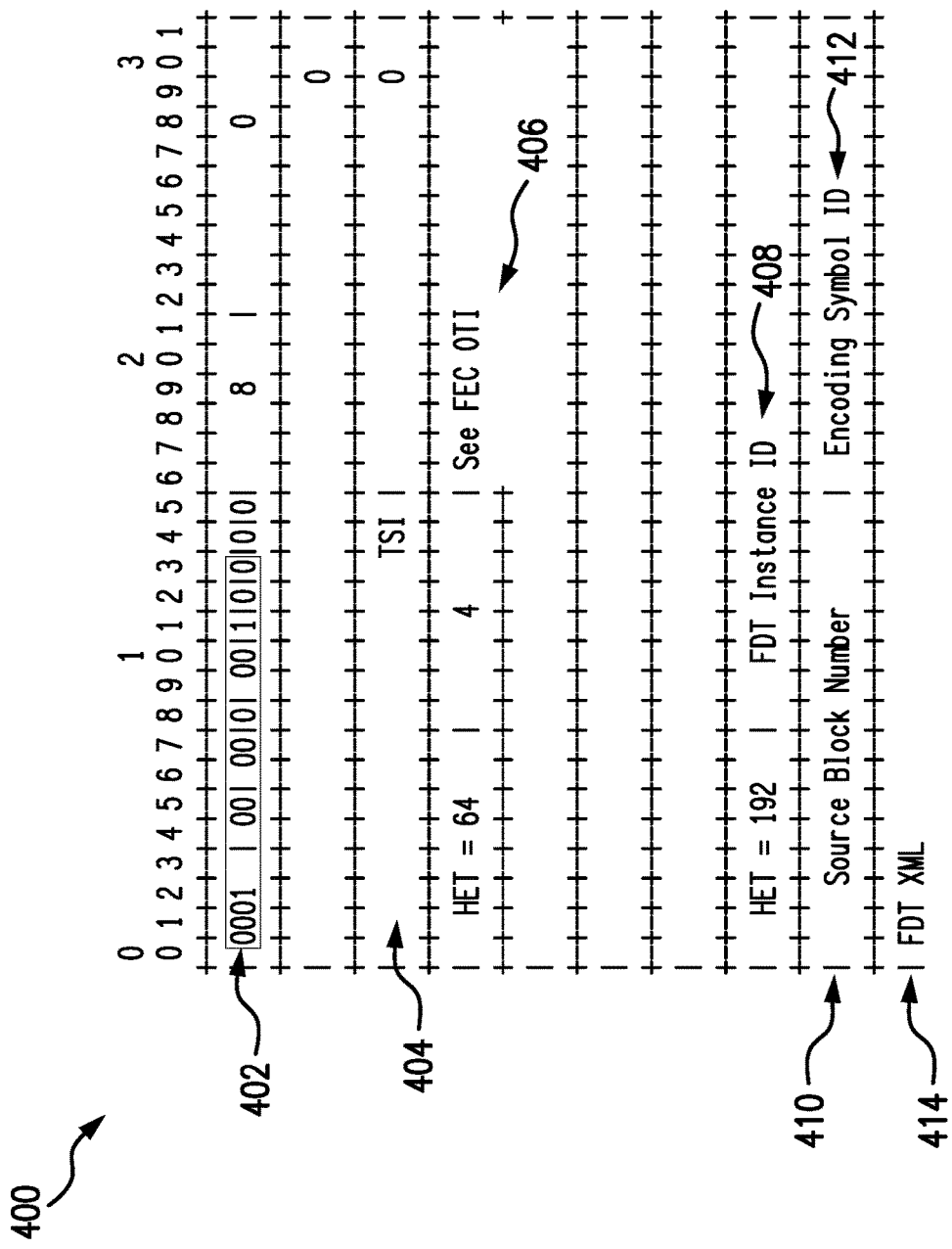
FIG. 4 is an illustration of a File Delivery Table (FDT)

FIG. 4 is an illustration of a FDT (file delivery table) 400. As noted above, the FDT 400 may provide a mechanism for describing various attributes associated with video files that may be delivered within the eMBMS file delivery session. The following lists are examples of such attributes, and are not intended to be mutually exclusive nor exhaustive. Attributes related to the FDT 400 may include a FLUTE packet header 402. The FLUTE packet header 402 has the following fields: Control flags (V, C, r, S, O, H, T, R, A, B): Version (V), Congestion control flag (C), reserved (r), TSI present flag (S), TOI present flag (O), Transport Session Size Variable (H), which may be used in defining the sizes of the TSI and TOI, Sender Current Time present flag (T), Expected Residual Time presence flag (R), Close Session flag (A), Close Object flag (B) in which all flags, except A and B, are fixed in eMBMS. In addition, the FDT 400 may include the following attributes: a TSI value 404 that can be used to correlate FDT data 400 with FLUTE media session, an FEC OTI value 406 (including the FDT Instance ID 408), size of the transport object carrying the file, Source Block Number 410, Encoding Symbol ID 412 and FDT XML 414.

Figure 5:
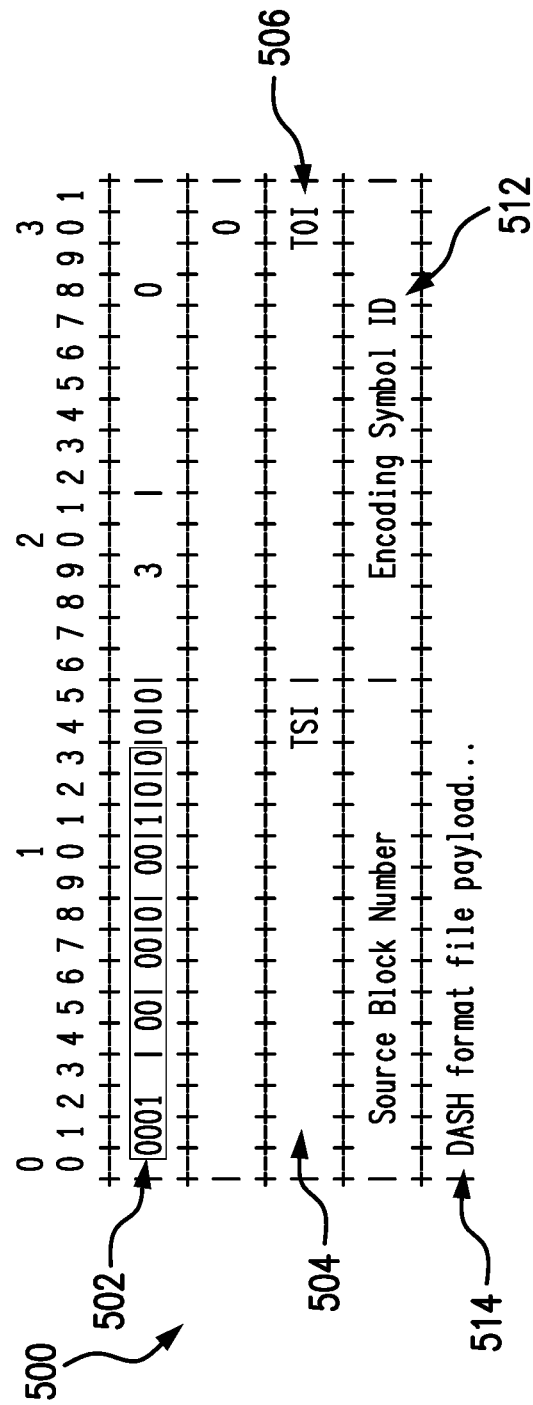
FIG. 5 illustrates basic FLUTE video packet format.

FIG. 5 illustrates basic FLUTE video packet format. As shown in FIG. 5, a FLUTE video packet 500 may include a FLUTE packet header 502, substantially equivalent to the FLUTE header 402 described above. It may further include fields such as, TSI 504, TOI 506 and Encoding Symbol ID 512. It should be noted that payload 514 of the FLUTE video packet 500 may include DASH formatted content. Each segment of the DASH formatted content might comprise, for example, 2 seconds of video content encoded at 1 Mbps, i.e., each segment is approximately 1 MB in size. When the DASH formatted content is eventually played back by the end user on a mobile device 112, full fidelity of the play back is desirable, i.e., without video artifacts or skips or buffering, and the end user may only desire to play back portions of the content delivered. For efficiency and flexibility in the transport and playback, e.g., to be able to format the content once into DASH format and deliver it over a variety of transports without reformatting, it is desirable that each segment be delivered as a separate file.

Figure 6B:
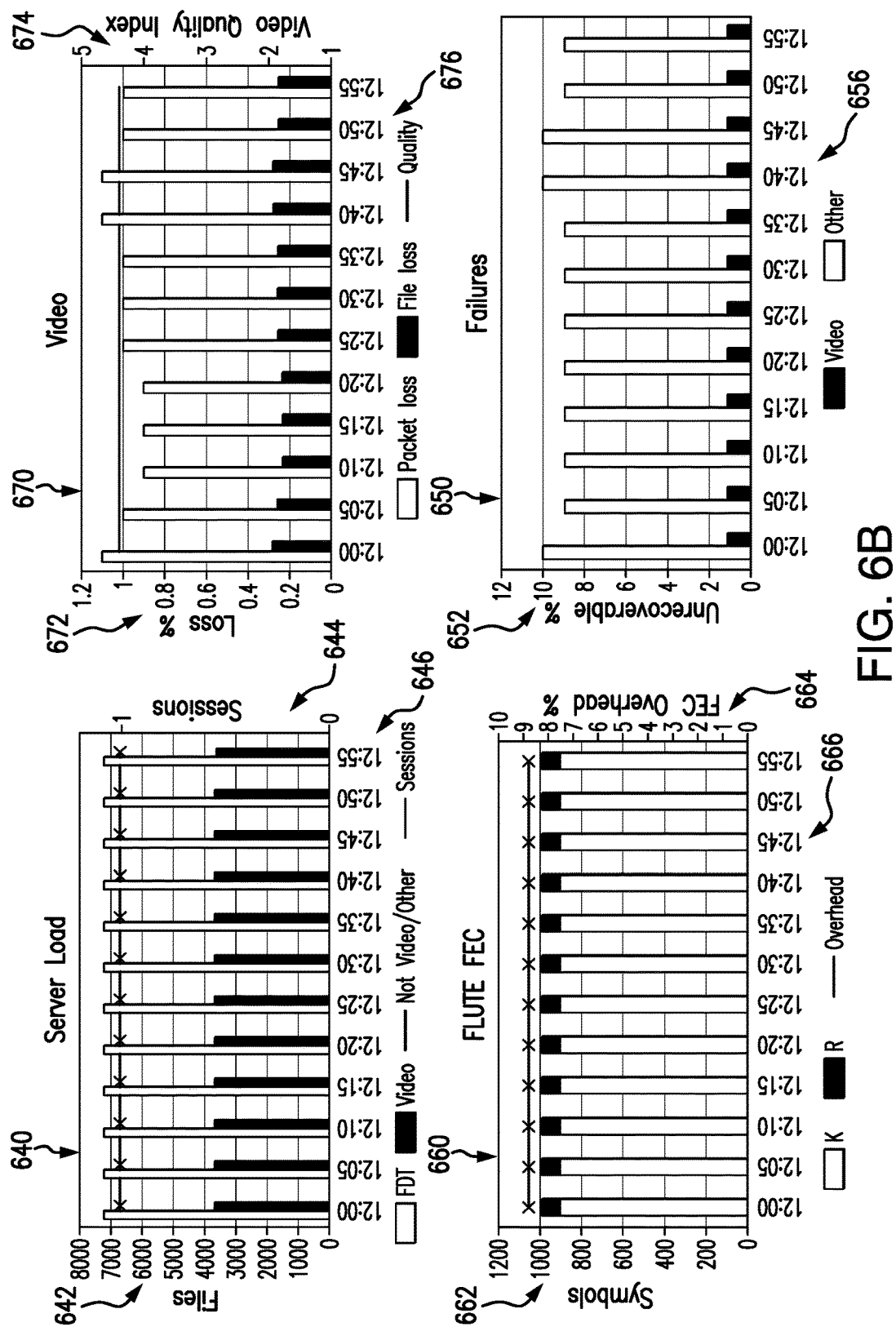

As noted above, the monitoring results may be communicated by the quality assessment module 130 to one or more external devices that may host a GUI. FIGS. 6A-6B depict exemplary screenshots of the quality assessment system. In one embodiment, two different modes may be presented to a user: a table mode (FIG. 6A) and a graph mode (FIG. 6B). These modes are exemplary, and any combination of the modes shown, along with other modes, may be presented to the user.

The table mode illustrated in FIG. 6A presents data in a tabular format. In one embodiment, monitoring results may be presented for each combination of server and multicast address, just the way they are stored in the aforementioned KSI and KEI tables. Various monitored parameters related to categories of server load 602, failed segments 604, FEC information 606 and video quality analysis results 608 may be displayed. For example, the server load category 602 may present calculated parameters, such as, total number of sessions 610, total number of captured video files 612, total number of captured FDTs 614 and total number of sessions not including video files 616 for each pair of addresses. Furthermore, the failed segments category 604 may include accumulated counts for video segments 618 and other segments 620; the FEC information category 606 may include accumulated information related to overhead percentage 624, total number of source symbols 626 and total number of repair symbols 628, while the video quality category 608 may include the average bit rate of the video files 630, packet loss percentage 632, segment loss percentage 634 and a quality index 636. The quality index value 636 represents the value calculated by the quality assessment module 130 at step 312, as described above in conjunction with FIG. 3.

In FIG. 6B, first graph 640 represents accumulated server load video files volume 642 and sessions data 644 plotted against time 646 for a particular pair of addresses. Second graph 650 represents a similar plot for accumulated failures data represented as percentage of unrecoverable files 652 plotted against time 656. Third graph 660 represents a similar plot for FLUTE FEC metrics represented by accumulated K and R symbols 662 and FEC overhead percentage 664 plotted against time 666. Fourth graph 670 shows yet another similar plot for calculated video quality index data represented as percentage of lost files 672 and calculated video quality index 674 plotted against time 676. Each graph 640, 650, 660 and 670 depicts data for a specified period of time, such as one hour. This allows the eMBMS network operators to monitor delivery of video streaming data in near real-time mode. Consequently, in case any significant delivery issues are detected, it is preferable for the user to address the detected issues early should this be possible.

In summary, various embodiments of the present invention describe a novel video delivery performance analysis for eMBMS monitoring approach that offers a cost-effective and service agnostic video stream monitoring solution capable of combining and correlating the streaming video service performance metrics in eMBMS environment and capable of generating a video quality index without adding a significant overhead. Advantageously, in a preferred embodiment, the quality assessment module 130 analyzes the FEC applied to multicast video packets and produces various information and metrics of interest. Various embodiments of the present invention introduce a new approach aimed at utilizing a determined number of missing video segments and the ability of FEC to automatically correct at least a portion of detected packet loss corresponding to a predetermined assessment period, which is enabled to proactively ensure that a given video stream is fully functional and operational across all stages of end-to-end eMBMS video content delivery to the end users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
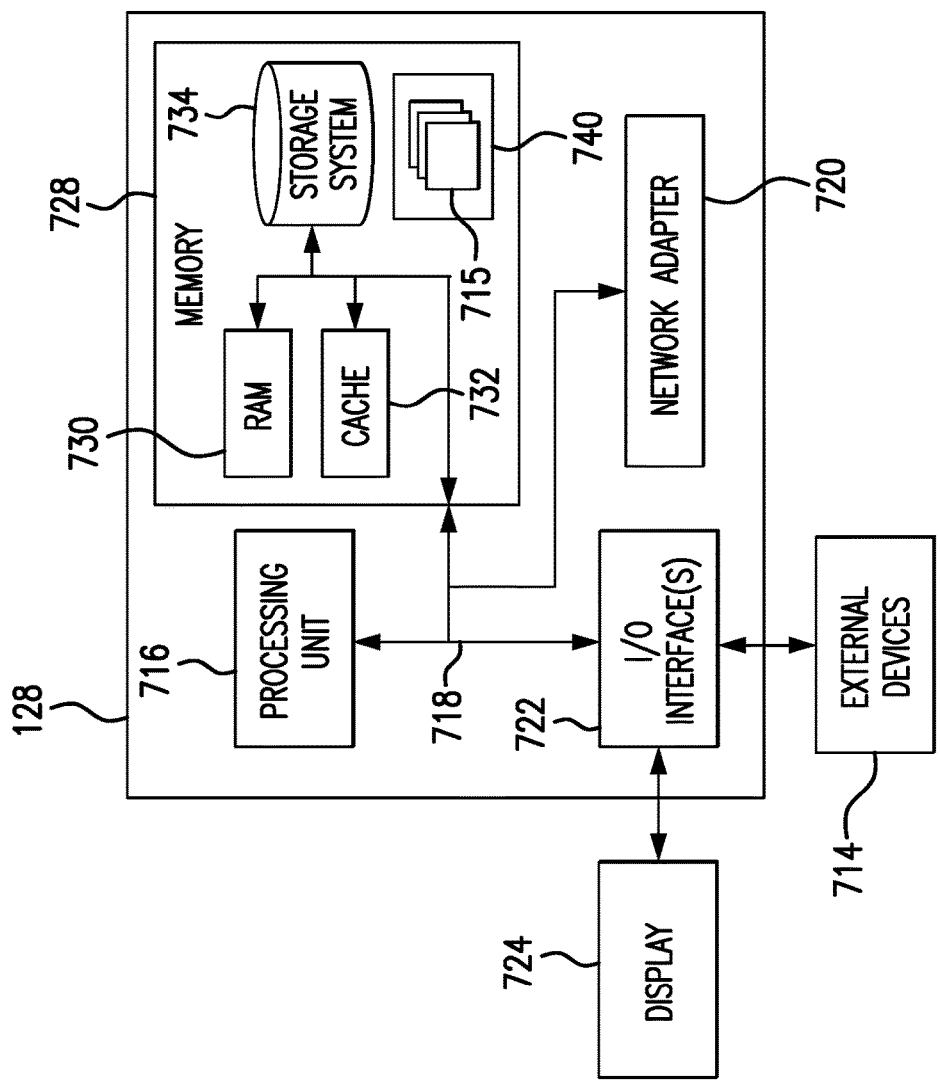
FIG. 7 illustrates internal and external components of a quality analyzer device in accordance with illustrative embodiments of the present invention.

Embodiments of eMBMS media session monitoring framework may be implemented or executed by a centralized non-intrusive quality analyzing system comprising one or more computer servers. One such quality analyzing system 128 is illustrated in FIG. 7. In various embodiments, quality analyzing system 128 may be a server, a mainframe computer system, a workstation, a network computer, a desktop computer, a laptop, or the like.

Quality analyzing system 128 is only one example of a suitable system and is not intended to suggest any limitation as to the scope of use or functionality of embodiments of the invention described herein. Regardless, quality analyzing system 128 is capable of being implemented and/or performing any of the functionality set forth hereinabove.

Quality analyzing system 128 may be described in the general context of computer system-executable instructions, such as program modules, being executed by a computer system. Generally, program modules may include routines, programs, objects, components, logic, data structures, and so on that perform particular tasks or implement particular abstract data types. Quality analyzing system 128 may be practiced in distributed data processing environments where tasks are performed by remote processing devices that are linked through a communications network. In a distributed data processing environment, program modules may be located in both local and remote computer system storage media including memory storage devices.

Quality analyzing system 128 is shown in FIG. 7 in the form of a general-purpose computing device. The components of quality analyzing system 128 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Quality analyzing system 128 typically includes a variety of computer system readable media. Such media may be any available media that is accessible by quality analyzing system 128, and it includes both volatile and non-volatile media, removable and non-removable media.

System memory 728 can include computer system readable media in the form of volatile memory, such as random access memory (RAM) 730 and/or cache memory 732. Quality analyzing system 128 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 715, such as quality assessment module 130, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the invention as described herein.

Quality analyzing system 128 may also communicate with one or more external devices 714 such as a keyboard, a pointing device, a display 724, etc.; one or more devices that enable a user to interact with quality analyzing system 128; and/or any devices (e.g., network card, modem, etc.) that enable quality analyzing system 128 to communicate with one or more other computing devices. Such communication can occur via Input/Output (I/O) interfaces 722. Still yet, quality analyzing system 128 can communicate with one or more networks such as a local area network (LAN), a general wide area network (WAN), and/or a public network (e.g., the Internet) via network adapter 720. As depicted, network adapter 720 communicates with the other components of quality analyzing system 128 via bus 718. It should be understood that although not shown, other hardware and/or software components could be used in conjunction with quality analyzing system 128. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for evaluating quality of video delivered over a telecommunications network, the system comprising:
    one or more monitoring probes coupled to one or more network interfaces providing direct communication between two or more networked devices, the monitoring probes configured to capture video data from the network interfaces; and
    a processor adapted to analyze the video data captured by the monitoring probes, the processor operatively configured to:
    determine a number of lost data packets within the captured video data;
    determine probability of unrecoverable losses that cannot be decoded within the captured video data based on the determined number of lost data packets wherein the captured video data comprises one or more Forward Error Correction (FEC) encoded video files and wherein the captured video data comprises one or more DASH formatted content segments;
    monitor links between a media server and a Broadcast Multicast Service Center (BMSC) and determine missing HTTP video data segments due to failure in DASH segmentation; and
    calculate a video quality index value based on the determined probability of unrecoverable losses.

2. The system as recited in claim 1, wherein the telecommunications network comprises an LTE network and wherein the two or more networked devices comprise at least a content server having a video encoding module, a broadcast multicast service center (BM-SC), a Multimedia Broadcast Multimedia Service (MBMS) Gateway (GW) and an access network entity (eNodeB).

3. The system as recited in claim 1, wherein at least two of the networked devices are configured to communicate via at least a Dynamic Adaptive Streaming over Hypertext Transfer Protocol (DASH) protocol and a File Delivery over Unidirectional Transport (FLUTE) protocol.

4. The system as recited in claim 3, wherein the captured video data comprises one or more Forward Error Correction (FEC) encoded video files.

5. The system as recited in claim 4, wherein the processor is operatively configured to determine absolute reception overhead within the FEC encoded video files.

6. The system as recited in claim 5, wherein the FEC encoded video files each comprise one or more FEC blocks comprising a plurality of source symbols and a plurality of repair symbols and wherein the absolute reception overhead is determined based on a number of the encoded repair symbols and a number of the encoded source symbols.

7. The method as recited in claim 4, wherein the captured video data comprises one or more DASH formatted content segments and wherein size of each of the DASH segments is approximately equal to 1 MB.

8. The method as recited in claim 4, wherein the FEC encoded video files each employ Raptor R10 encoding scheme.

9. The system as recited in claim 1, wherein the processor operatively configured to determine the number of lost data packets and to determine the probability of unrecoverable losses is further operatively configured to determine a number of lost File Delivery Table (FDT) packets and operatively configured to determine the probability of unrecoverable losses based on the determined number of lost FDT packets.

10. The system as recited in claim 1, wherein the processor is further operatively configured to derive an expected number of packets by tracking the highest sequence number seen in a given block.

11. The system as recited in claim 1, wherein: the probability (Pf) that a given FEC block cannot be recovered is defined by:

$$P_f = 1;\ \text{if}\ N<K;\ \text{and}$$

$$P_f = 0.85 * 0.567^{N-K};\ \text{if}\ N \geq K,$$

wherein N represents the total number of source and repair symbols received after any packet loss.

12. A method for evaluating quality of video delivered over a telecommunications network, the method comprising steps of:
    receiving captured video data from one or more monitoring probes coupled to one or more network interfaces providing direct communication between two or more networked devices wherein the captured video data comprises one or more Forward Error Correction (FEC) encoded video files and wherein the captured video data comprises one or more DASH formatted content segments and wherein size of each of the DASH segments is approximately equal to 1 MB;
    monitor links between a media server and a Broadcast Multicast Service Center (BMSC) and determine missing HTTP video data segments due to failure in DASH segmentation;
    analyzing the captured video data to determine a number of lost data packets;
    determining probability of unrecoverable losses within the captured video data based on the determined number of lost data packets; and
    calculating a video quality index value based on the determined probability of unrecoverable losses wherein the telecommunications network comprises an LTE network and wherein the two or more networked devices comprise at least a content server having a video encoding module, a BM-SC, a MBMS GW and an access network entity (eNodeB) and at two of the networked devices are configured to communicate via at least a DASH protocol and a FLUTE protocol and the FEC encoded video files each employ Raptor R10 encoding scheme.

13. The method as recited in claim 12, wherein the step of analyzing the captured video data further comprises determining absolute reception overhead within the FEC encoded video files.

14. The method as recited in claim 13, wherein the FEC encoded video files each comprise one or more FEC blocks comprising a plurality of source symbols and a plurality of repair symbols and wherein the absolute reception overhead is determined based on a number of the encoded repair symbols and a number of the encoded source symbols.

15. The method as recited in claim 12, wherein the steps of determining the number of lost data packets and determining the probability of unrecoverable losses further comprise determining a number of lost FDT packets and determining the probability of unrecoverable losses based on the determined number of lost FDT packets.

16. The method as recited in claim 12, further comprising the step of maintaining transmission state information.

17. The method as recited in claim 12, wherein: the probability (Pf) that a given FEC block cannot be recovered is defined by:

$$P_f=1; \text{ if } N<K; \text{ and}$$

$$P_f=0.85*0.567^{N-K}; \text{ if } N \geq K,$$

wherein N represents the total number of source and repair symbols received after any packet loss.

* * * * *